US007274823B2

United States Patent
Lane et al.

(10) Patent No.: US 7,274,823 B2
(45) Date of Patent: Sep. 25, 2007

(54) SYSTEM AND METHOD FOR PROCESSING SYMBOLS EMBEDDED IN DIGITAL VIDEO

(75) Inventors: Richard D. Lane, San Diego, CA (US); Amnon Silberger, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 10/293,593

(22) Filed: Nov. 12, 2002

(65) Prior Publication Data

US 2004/0091161 A1    May 13, 2004

(51) Int. Cl.
    *G06K 9/36*     (2006.01)
    *G06K 9/46*     (2006.01)

(52) U.S. Cl. .................. 382/232; 382/243; 341/50; 341/87

(58) Field of Classification Search .......... 382/232, 382/233, 243; 341/50, 87; 375/240.01
See application file for complete search history.

(56) References Cited

U.S. PATENT DOCUMENTS

| | | | | |
|---|---|---|---|---|
| 5,960,081 A | * | 9/1999 | Vynne et al. ............... 713/176 |
| 6,014,466 A | * | 1/2000 | Xia et al. ................... 382/243 |
| 6,289,174 B1 | * | 9/2001 | Hirono ....................... 386/131 |
| 6,381,368 B1 | * | 4/2002 | Kanatsu ...................... 382/233 |
| 6,614,930 B1 | * | 9/2003 | Agnihotri et al. ........... 382/176 |
| 6,714,591 B1 | * | 3/2004 | Katata et al. .......... 375/240.08 |
| 6,775,412 B1 | * | 8/2004 | Nister et al. ................ 382/243 |
| 7,020,336 B2 | * | 3/2006 | Cohen-Solal et al. ....... 382/204 |

OTHER PUBLICATIONS

Erasing Video Logos Based on Image Inpainting, Yan et al., IEEE, Multimedia and Expo, 2002, pp. 521-524.*

* cited by examiner

Primary Examiner—Bhavesh M Mehta
Assistant Examiner—John B Strege
(74) Attorney, Agent, or Firm—Thomas Rouse; Timothy F. Loomis; Timothy E. Buckley

(57) ABSTRACT

Video images in, e.g., a multimedia stream are scanned prior to compression for transmission to recognize symbols, such as graphics symbols and alpha-numeric characters. The types, positions, sizes, etc. of the symbols are recorded to render symbol information, and then the images are compressed with or without compressing the symbols, which may be removed from the images prior to compression if desired. The compressed video and symbol information are sent to a receiver, which decompresses the video, optionally transforms the symbols, and then inserts the symbols where indicated by the symbol information.

63 Claims, 3 Drawing Sheets

COMPRESSION/TRANSMISSION LOGIC

FUNCTIONAL BLOCK
DIAGRAM*

COMPRESSION/TRANSMISSION LOGIC

RECEIVE/DECOMPRESS LOGIC

SYSTEM AND METHOD FOR PROCESSING SYMBOLS EMBEDDED IN DIGITAL VIDEO

FIELD OF THE INVENTION

The present invention relates generally to multimedia transmission.

BACKGROUND

Multimedia streams, which typically include video frames, are compressed prior to transmission, to conserve bandwidth. Compressing video generally means representing a relatively larger group of bits with a relatively smaller group of bits.

When a video frame or frames contains a symbol, generally used herein to refer to both graphics symbols and alpha-numeric characters, the bits representing the symbol are compressed along with the bits representing the image. That is, when video is overlaid with graphics or alpha-numeric symbols, both the underlying image and the symbols are compressed together for transmission. Upon receipt, the stream is decompressed to render a "lossy" version of the original image.

The present invention understands that compressing and decompressing a multimedia stream, while critical to the efficient transmission of multimedia, often results in some lost data. As a result, some useful information in the original stream might not reappear in the decompressed stream. The present invention further understands that in the context of video images, losing a small amount of information usually is of small consequence, since a viewer will be unable to detect the loss in the relatively large volume of data that makes up a video image.

The present invention critically recognizes, however, that symbols generally do not require much data to render. Consequently, losing a small amount of symbol information during the compression/decompression process can result in detectable distortions and/or artifacts in the decompressed symbol. Furthermore, having to compress and transmit symbols along with the images to which they pertain consumes multimedia transmission bandwidth.

In addition to the above recognition, the present invention understands that transmission of images over wireless links to portable devices often necessitates a significant reduction in resolution. Reduced resolution means there are fewer pixels available for representing a symbol. The small display screens commonly used on mobile devices limits the ability of the human visual system, or HVS, to easily and accurately discern symbols. The present invention understands that being able to enlarge or transform symbols in video that is displayed on small screens would improve the ability of the HVS to discern the symbols. With these observations in mind, the invention below is provided.

SUMMARY OF THE INVENTION

A system for processing an image, such as a video image, that has a symbol, such as a graphics symbol or an alpha-numeric character, includes a processor that executes logic including scanning the image. Also, the processor uses character/symbol recognition techniques to create a representation of the symbol, and then compresses the image to render a compressed image.

In a preferred embodiment, the logic executed by the processor can include blanking out the symbol in the image prior to the act of compressing. Alternatively, the symbol may be compressed along with the image. The representation of the symbol may include not only a symbol type or identification, but also other descriptive parameters including but not limited to symbol identity, symbol position, symbol size, symbol font, and symbol color.

When the system includes a transmitter processor and the compressed image and representation of the symbol are transmitted, the system can further include a receive processor that decompresses the compressed image to render a decompressed image. Using the representation of the symbol, the receiver processor can combine the symbol with the decompressed image. For instance, the receive processor can use the position of the symbol to insert the symbol or a transformed version of the symbol into the decompressed image. The representation of the symbol may be embedded in the compressed stream, or it may be transmitted separately therefrom.

In another aspect, a method for processing a multimedia stream that includes video image information and symbols in the video includes removing the symbols from the stream, and then compressing the video image information to render a compressed stream.

In still another aspect, a receive processor decompresses a compressed video stream to render a decompressed image. Using a representation of a symbol that had been included in the original image, the receive processor combines the symbol with the decompressed image. The preferred non-limiting symbol representation could take on one of several forms. For example, a pixel-by-pixel bit map representation of the symbol can be sent either embedded in the compressed stream in, e.g., a header of the compressed stream, or the bitmap can be transmitted in a separate stream. Or, a code representing the symbol can likewise be transmitted in lieu of a bitmap.

In yet another aspect, a computer product is disclosed for processing scanned video images having symbols. The product includes means for recognizing symbols in the scanned images to render symbol information. Means then compress the images.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
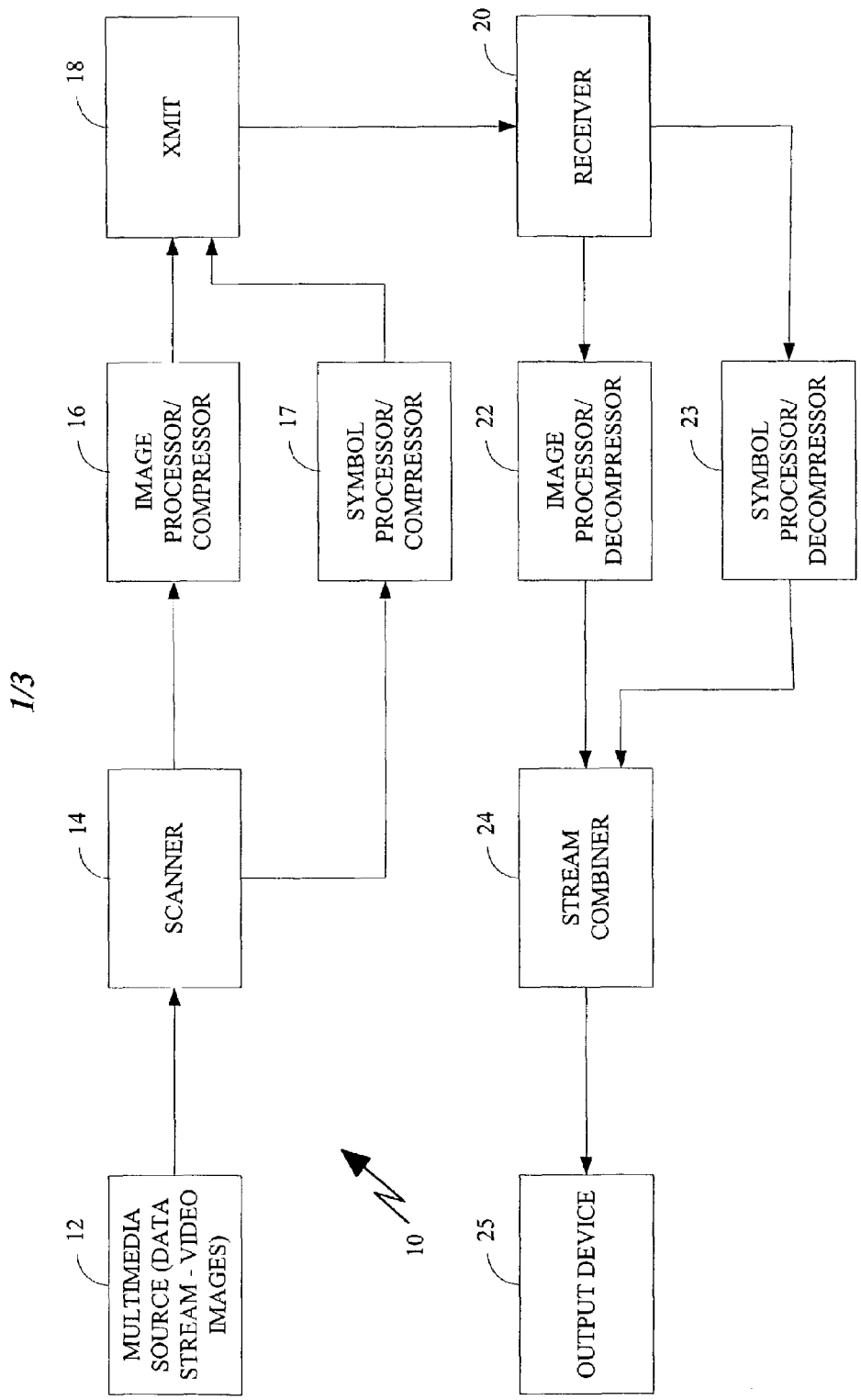
FIG. 1 is a functional block diagram of the present system.

Referring initially to FIG. 1, a system is shown, generally designated 10, for transmitting and receiving compressed multimedia including video streams, from a source 12 of multimedia. While the disclosure herein focusses on the video portion of multimedia streams, it is to be understood that the present principles apply to other multimedia including audio, slides, 2D graphics and 3D graphics, etc.

As shown, the system 10 includes a scanner 14 that scans the multimedia source images from the source 12 and sends the images and/or results of the scanning to a transmit processor 16, which, among other things, functions as a symbol recognizer and video compressor in accordance with the logic discussed below. As used herein, "symbol" means both graphics symbols and alpha-numeric characters, and consequently "symbol recognition" encompasses both symbol and character recognition.

Figure 2:
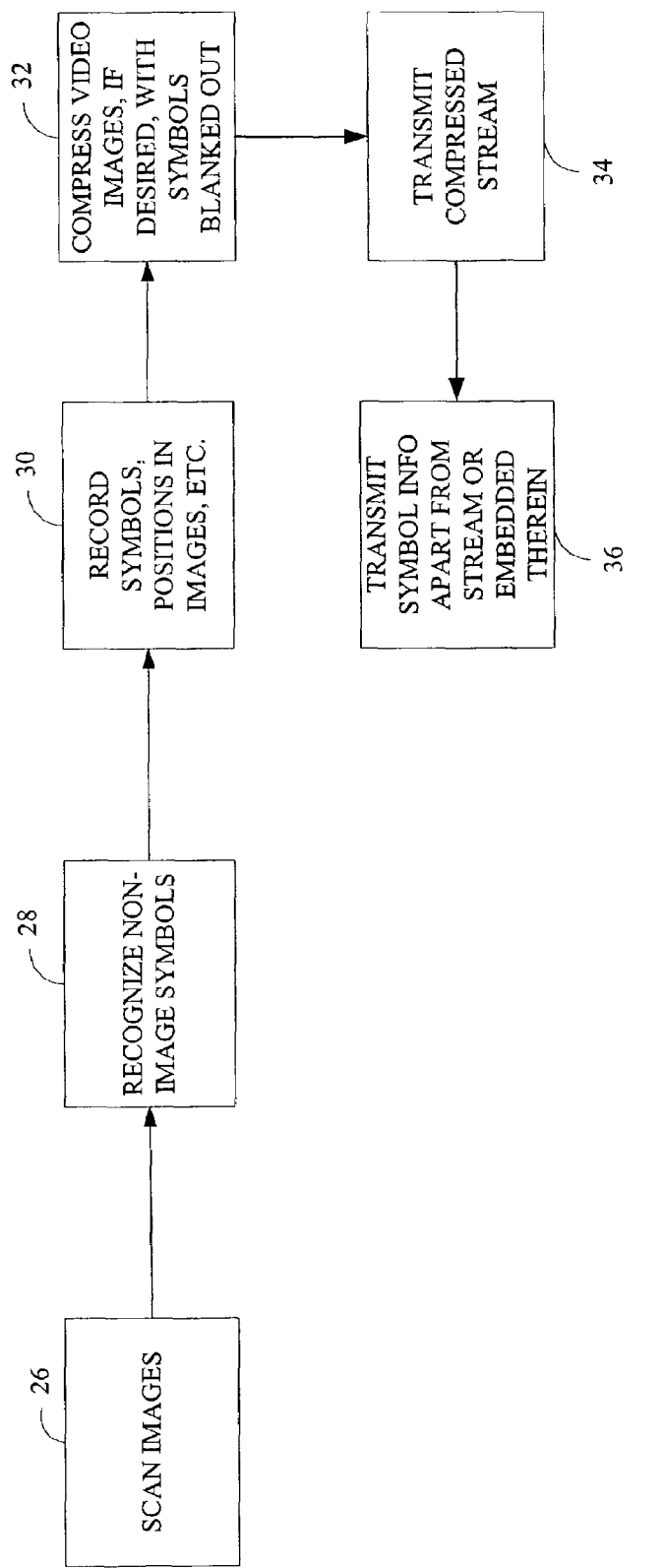
FIG. 2 is a flow chart of the compression and transmission logic.

While a single transmit processor 16 is shown for clarity of disclosure, plural processors can be used to execute the logic of FIG. 2. For instance, in embodiments wherein the symbols themselves are to be compressed apart from the stream, a symbol processor 17 can be provided as shown. As discussed below, compressed video, along with symbol information derived from character/symbol recognition, are sent to a transmitter 18 for transmission thereof.

The non-limiting preferred embodiment shown in FIG. 1 shows a multimedia transmitter 18 that uses wireless means, and more particularly that uses code division multiple access (CDMA) principles. The streams can be broadcast to plural receivers if desired, or transmitted using point-to-point or multicast wireless transmission principles. It is to be understood that the present principles apply to other forms of wireless communication such as GSM, TDMA, S-TDMA, wideband CDMA, OFDM, etc. as well as transmission of multimedia over cable systems, the Internet, etc.

One or more receivers 20 can receive the transmitted video and symbol information and send it to one or more receive processors 22. The receiver processor 22 functions as a video decompressor. If desired, the receiver processor 22 can also decompress symbols, if they were compressed during transmission, or the symbols can be decompressed by a separate symbol processor 23 as shown. A stream combiner 24 then combines the symbols with the image stream in accordance with the logic of FIG. 3 discussed below. The decompressed multimedia with symbols can be displayed on an output device 25, such as a video display, printer, speaker, etc.

Now referring to FIG. 2, the compression and transmission logic can be seen. At block 26, video images in the stream are scanned by an appropriate scanning device 14. Any appropriate scanner 14 may be used. Preferably, the images are scanned at a relatively high sampling rate that is sufficient to reduce or eliminate distortion of symbols in the video images. A digitized representation of the images with symbols is generated by the scanner 14.

If desired, not all video frames in a stream need be scanned. For example, every tenth frame might be scanned until a symbol is detected. Then, every succeeding frame can be scanned for the symbol. When a frame is encountered having no symbols, the scanning frequency can revert to every $n^{th}$ frame. In this way, scanning speed is increased.

Proceeding to block 28, symbols in the image are recognized by character recognition software executed on the transmit processor 16 (or, if desired, the symbol processor 17). Any appropriate character recognition algorithms can be used. The transmit processor 16 (or symbol processor 17) generates symbol information, i.e., binary representations of the symbols that indicate not only the identification (type) of symbol scanned, but also, preferably, the position of the symbol in the image, and if desired the color, font, size, etc. of the symbol.

Accordingly, as used herein "symbol information" and information/data "representation of a symbol" are distinct from the pixellated data that represents the color or grayshade of the non-symbol portions of the video images on a pixel-by-pixel basis. Rather, "symbol information" means the binary code that is output by a character recognition engine that can be correlated to a particular symbol (and its characteristics mentioned above). This symbol information is recorded at block 30.

After scanning, the video images (at a minimum, the pixel information representing non-symbol image data) are compressed at block 32. Any appropriate video compression scheme or algorithm may be used. In one preferred embodiment, the compression ignores the symbols in the original image by, e.g., the processor 16 blanking out the symbols (e.g., by setting the pixels covered by the symbol area to a single predetermined binary value), such that the symbols are not compressed during image compression. This saves bandwidth. Other means known in the art for ignoring portions of an image stream to be compressed may be used. For example, a symbol in an image can be replaced with pixel information that matches the pixel information surrounding the symbol, which when compressed would render a smaller stream than would be rendered otherwise. Or, the symbol can be replaced with ancillary data useful for control, conveying general information, or error correction. However, if desired the symbols in the image need not be blanked out, but may be compressed along with the image data, with the recognized symbol information nonetheless being used at the receiver to render non-distorted symbols after expansion. In any case, as mentioned above the symbol information output by the symbol recognition algorithm can itself be compressed (by, e.g., the symbol processor 17), whether transmitted separately with the compressed video information or with it (e.g., in the video frame headers).

The compressed stream representing the video images is transmitted at block 34. At block 36, the symbol information rendered by the character recognition logic of the transmit processor 16 (or symbol processor 17) is also transmitted. This symbol information may be transmitted apart from the compressed video image stream, indeed, it may be transmitted on an entirely different channel than the video stream. Or, the symbol information may be embedded in the stream, e.g., the symbol information may be included in headers of video frames.

When the symbols are transmitted separately from the video stream, the symbols may be transmitted on a wireless communication path and the video stream transmitted on another wireless path or indeed a separate transmission system. The symbols and video stream can be transmitted point-to-point to a receiver, or they can be multicast or broadcast to plural receivers.

Figure 3:
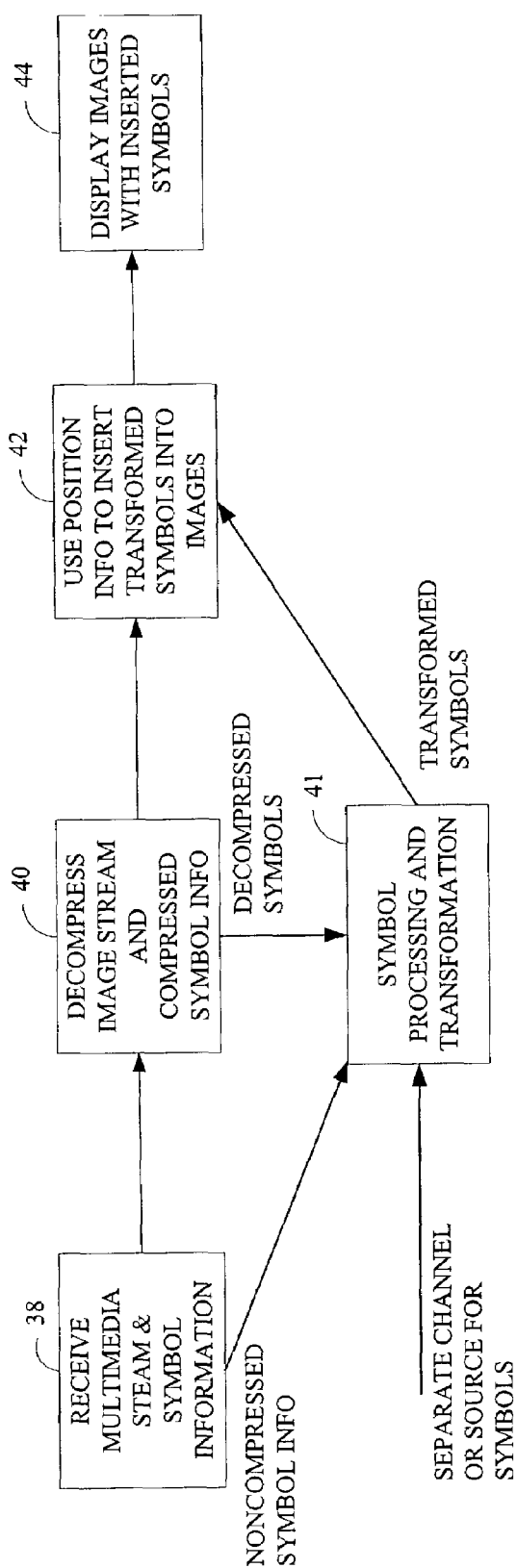
FIG. 3 is a flow chart of various receive and decompress methods that can be used.

Now referring to FIG. 3, at block 38 the compressed video image stream is received. Also at block 38, when the symbol information is transmitted along with the video stream in the same channel, it also is received. Moving to block 40, the compressed video stream is decompressed, as is the symbol information, if it had been compressed and transmitted in, e.g., the headers of the video stream. On the other hand, if the symbol had not been compressed, it is sent from block 40 to block 41, where the symbol can be processed and transformed as desired to improve visibility. For example, at block 41 the symbol can be decoded, if an encoded representation of the symbol had been sent, and if desired enlarged or otherwise transformed (by, e.g., changing the shape, font, color, or other attribute of the symbol). FIG. 3 also shows the alternative wherein the symbols are transmitted separately from the video stream, in which embodiment the symbols are received directly from their separate channels to block 41 for transformation and/or processing.

At block 42, the position information and the other information in the symbol information can be used to re-insert the symbols into their corresponding positions in the video images, with the images with symbols being displayed at block 44.

With the above invention, it may be appreciated that the symbols in a video stream may be handled separately from the video images themselves, allowing for greater flexibility. For instance, the symbols can be transmitted separately from the video stream. Also, the symbols can be repositioned in the images if desired in time or space by the receiver processor 22. Moreover, the symbols can be enlarged in the decompressed video images for enhanced visibility, or replaced altogether by icons to consume less space on the video images to improve picture quality and symbol recognition and readability. Still further, the icons can be used as drop-down or pop-up menus which when a representative symbol is selected by a user could display the scanned symbol. Indeed, the symbols can be displayed separately from the video images if desired.

While the particular SYSTEM AND METHOD FOR PROCESSING SYMBOLS EMBEDDED IN DIGITAL VIDEO as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A method for processing a multimedia stream including at least video image information, comprising:
    scanning at least a portion of the multimedia stream to detect whether a symbol is present within the video image information;
    creating a correlated symbol representation for the detected symbol;
    producing remaining video image information by removing the symbol from the video image information of the multimedia stream;
    compressing the remaining video image information of the multimedia stream to render a compressed stream; and
    transmitting the compressed stream along with the correlated symbol representation, the correlated symbol representation being embedded in the compressed stream.

2. The method of claim 1, wherein the correlated symbol representation includes at least one symbol characteristic, which comprises one or more items selected from a list of items, the list of items including a position of the symbol within the video image information, a color of the symbol, a font type of the symbol, a size of the symbol and a binary code for the symbol.

3. The method of claim 1, wherein the video image information includes a plurality of video frames and scanning at least a portion of the multimedia stream further includes only scanning every n-th frame of the plurality of video frames until the symbol is detected.

4. The method of claim 1, wherein the image information represents at least one image frame of a plurality of image frames, and further wherein scanning comprises scanning the at least one image frame prior to the act of compressing.

5. The method of claim 4, further comprising using character recognition to detect the symbol.

6. The method of claim 4, wherein the correlated symbol representation includes at least one symbol characteristic, which comprises a position of the symbol in the at least one image frame.

7. The method of claim 6, further comprising decompressing the compressed stream to render a decompressed stream.

8. The method of claim 7, further comprising using the position of the symbol to insert the symbol into at least one image represented by the decompressed stream.

9. The method of claim 1, comprising transmitting the compressed stream apart from the correlated symbol representation.

10. The method of claim 1, wherein removing comprises blanking out the symbol prior to the act of compressing.

11. The method of claim 1, wherein the removing act comprises replacing pixel information representing the symbol with pixel information that matches pixels surrounding the symbol, prior to the compressing act.

12. The method of claim 1, comprising transmitting at least one of the compressed stream and the correlated symbol representation over a wireless channel.

13. The method of claim 12, wherein the wireless channel is a broadcast channel.

14. The method of claim 12, wherein the compressed stream is transmitted on a first wireless channel and the correlated symbol representation is transmitted on a second wireless channel.

15. The method of claim 14, wherein at least one of the channels is a broadcast channel.

16. The method of claim 12, wherein the compressed stream is transmitted on a first transmission system and the correlated symbol representation is transmitted on a second transmission system.

17. A system for processing a multimedia stream comprising at least video image information, said system comprising a processor including logic for undertaking the acts of:
    scanning at least a portion of the multimedia stream to detect whether a symbol is present within the video image information;
    rendering a correlated symbol representation of the symbol if the symbol is present;
    producing remaining video image information by removing the symbol from the video image information of the multimedia stream; and
    compressing the correlated symbol representation and the remaining video image information to render a compressed stream.

18. The system of claim 17, wherein the act of producing undertaken by the processor includes at least one of:
blanking out the symbol in the video image information prior to the act of compressing;
replacing pixel information representing the symbol with pixel information that matches pixels surrounding the symbol, prior to compressing;
replacing pixel values representing the symbol with values that when compressed with the image produce a smaller compressed stream as compared to compression of the video image information with pixel values representing the symbol; and
replacing the symbol with data relating to one or more of control, conveying general information, and error correction.

19. The system of claim 17, wherein the video image information includes a plurality of video frames and scanning at least a portion of the multimedia stream includes only scanning every n-th frame of the plurality of video frames until the symbol is detected.

20. The system of claim 17, wherein the processor is a transmitter processor, and the compressed stream and the correlated symbol representation are transmitted, and further wherein the correlated symbol representation includes at least one symbol characteristic, which comprises a position of the symbol in the video image information.

21. The system of claim 17, wherein the correlated symbol representation includes at least one symbol characteristic, which comprises one or more items selected from a list of items, the list of items including: a position of the symbol within the video image information, a binary code for the symbol, a color of the symbol, a size of the symbol, and a font of the symbol.

22. The system of claim 20, wherein the system further includes a receive processor executing logic to undertake acts comprising:
decompressing the compressed stream to render a decompressed stream;
using the correlated symbol representation to render a symbol image; and
combining the symbol image with the decompressed stream.

23. The system of claim 22, wherein the acts undertaken by the receive processor further comprise using the position of the symbol to combine the symbol into the decompressed image.

24. The system of claim 17, wherein at least one of the compressed stream and the correlated symbol representation is transmitted over a wireless channel.

25. The system of claim 24, wherein the wireless channel is a broadcast channel.

26. The system of claim 17, wherein the compressed stream is transmitted on a first wireless channel and the correlated symbol representation is transmitted on a second wireless channel.

27. The system of claim 26, wherein at least one of the channels is a broadcast channel.

28. The system of claim 17, wherein the compressed stream is transmitted on a first transmission system and the correlated symbol representation is transmitted on a second transmission system.

29. The system of claim 22, wherein the acts undertaken by the receive processor further comprise using transformation parameters for the symbol to alter the correlated symbol representation before combining the correlated symbol representation with the decompressed stream.

30. An apparatus for processing a multimedia stream comprising at least video image information, comprising:
means for scanning at least a portion of the multimedia stream to detect whether a symbol is present within the video image information;
means for rendering a correlated symbol representation if the symbol is present, the correlated symbol representation includes at least one symbol characteristic, which comprises one or more items selected from a list of items, the list of items including: a position of the symbol within the video image information, a binary code for the symbol, a color of the symbol, a size of the symbol, and a font of the symbol;
means for producing remaining video image information by removing the symbol from the video information of the multimedia stream;
means for compressing the remaining video image information to render a compressed stream;
means for decompressing the compressed stream; and
means for combining the correlated symbol representation with the decompressed stream by using the at least one symbol characteristic.

31. The apparatus of claim 30, wherein the video image information includes a plurality of video frames and scanning at least a portion of the multimedia stream includes only scanning every n-th frame of the plurality of video frames until the symbol is detected.

32. The apparatus of claim 30, wherein the symbols are removed by at least one of:
means for blanking out of the symbol in the video image information prior to compressing;
means for replacing pixel values representing the symbol with pixel values at least approximately matching values surrounding the symbol; and
means for replacing the symbol with data relating to one or more of control, general information conveyance, and error correction.

33. The apparatus of claim 30, wherein the correlated symbol representation is transformed prior to combining it with the decompressed stream.

34. The apparatus of claim 30, further comprising:
means for decompressing a compressed correlated symbol representation.

35. A computer readable medium embodying instructions for performing a method for processing a multimedia stream comprising at least video image information, said computer-readable medium comprising:
instructions to scan at least a portion of the multimedia stream to detect whether a symbol is present within the video image information;
instructions to render a correlated symbol representation of the symbol if the symbol is present;
instructions to produce remaining video image information by removing the symbol from the video image information of the multimedia stream; and
instructions to compress the correlated symbol representation and the remaining video image information to render a compressed stream.

36. A method for processing a multimedia stream comprising at least video image information, comprising:
scanning at least a portion of the multimedia stream to detect whether a symbol is present within the video image information;
rendering a correlated symbol representation of the symbol if the symbol is present;

producing remaining video image information by removing the symbol from the video image information of the multimedia stream; and compressing the correlated symbol representation and the remaining video image information to render a compressed stream.

37. An apparatus for processing a multimedia stream comprising at least video image information, comprising:

a scanner configured to scan at least a portion of the multimedia stream to detect whether a symbol is present within the video information; and a transmit processor configured to:

render a correlated symbol representation of the symbol if the symbol is present;

produce remaining video image information by removing the symbol from the video image information of the multimedia stream; and compress the correlated symbol representation and the remaining video image information to render a compressed stream.

38. A method for processing a multimedia stream including at least video image information representing at least one image frame of a plurality of image frames, comprising:

scanning the at least one image frame of the multimedia stream prior to compressing to detect whether a symbol is present within the video image information;

creating a correlated symbol representation for the detected symbol, the correlated symbol representation includes at least one symbol characteristic, which comprises a position of the symbol in the at least one image frame;

producing remaining video image information by removing the symbol from the video image information of the multimedia stream;

compressing the remaining video image information of the multimedia stream to render a compressed stream;

decompressing the compressed stream to render a decompressed stream; and using the position of the symbol to insert the symbol into at least one image frame represented by the decompressed stream.

39. The method of claim 38, wherein the at least one symbol characteristic comprises one or more items selected from a list of items, the list of items including a color of the symbol, a font type of the symbol, a size of the symbol and a binary code for the symbol.

40. The method of claim 38, wherein scanning the at least one image frame of the multimedia stream farther includes only scanning every n-th frame of the plurality of image frames until the symbol is detected.

41. The method of claim 38, further comprising using character recognition to detect the symbol.

42. The method of claim 38, farther comprising using the position of the symbol to insert the symbol into the at least one image frame represented by the decompressed stream.

43. The method of claim 38, comprising transmitting the compressed stream apart from the correlated symbol representation.

44. The method of claim 38, further comprising transmitting the compressed stream along with the correlated symbol representation, the correlated symbol representation being embedded in the compressed stream.

45. The method of claim 38, wherein removing the symbol comprises blanking out the symbol prior to the act of compressing.

46. The method of claim 38, wherein removing the symbol comprises replacing pixel information representing the symbol with pixel information that matches pixels surrounding the symbol, prior to the compressing act.

47. The method of claim 38, comprising transmitting at least one of the compressed stream and the correlated symbol representation over a wireless channel.

48. The method of claim 47, wherein the wireless channel is a broadcast channel.

49. The method of claim 47, wherein the compressed stream is transmitted on a first wireless channel and the correlated symbol representation is transmitted on a second wireless channel.

50. The method of claim 49, wherein at least one of the wireless channels is a broadcast channel.

51. The method of claim 47, wherein the compressed stream is transmitted on a first transmission system and the correlated symbol representation is transmitted on a second transmission system.

52. A method for processing a multimedia stream including at least video image information, comprising:

scanning at least a portion of the multimedia stream to detect whether a symbol is present within the video image information;

creating a correlated symbol representation for the detected symbol;

producing remaining video image information by removing the symbol from the video image information of the multimedia stream;

compressing the remaining video image information of the multimedia stream to render a compressed stream; and transmitting the compressed stream on a first wireless channel and the correlated symbol representation on a second wireless channel.

53. The method of claim 52, wherein the correlated symbol representation includes at least one symbol characteristic, which comprises one or more items selected from a list of items, the list of items including a position of the symbol within the video image information, a color of the symbol, a font type of the symbol, a size of the symbol and a binary code for the symbol.

54. The method of claim 52, wherein the video image information includes a plurality of video frames and scanning at least a portion of the multimedia stream further includes only scanning every n-th frame of the plurality of video frames until the symbol is detected.

55. The method of claim 52, wherein the image information represents at least one image frame of a plurality of image frames, and further wherein scanning comprises scanning the at least one image frame prior to the act of compressing.

56. The method of claim 52, further comprising using character recognition to detect the symbol.

57. The method of claim 52, wherein the correlated symbol representation includes at least one symbol characteristic, which comprises a position of the symbol in the at least one image frame.

58. The method of claim 57, further comprising decompressing the compressed stream to render a decompressed stream.

59. The method of claim 58, further comprising using the position of the symbol to insert the symbol into at least one image represented by the decompressed stream.

60. The method of claim 52, further comprising transmitting the compressed stream apart from the correlated symbol representation.

61. The method of claim 52, wherein removing the symbol comprises blanking out the symbol prior to the act of compressing.

62. The method of claim 52, wherein removing the symbol comprises replacing pixel information representing the symbol with pixel information that matches pixels surrounding the symbol, prior to the compressing act.

63. The method of claim 52, wherein at least one of the wireless channels is a broadcast channel.

* * * * *